(12) United States Patent
Krueger et al.

(10) Patent No.: US 9,930,000 B2
(45) Date of Patent: Mar. 27, 2018

(54) METHOD FOR POSING REQUESTS IN A SOCIAL NETWORKING SITE

(71) Applicant: SIEMENS AKTIENGESELLSCHAFT, Munich (DE)

(72) Inventors: Thorsten Krueger, Warngau (DE); Manfred Langen, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 228 days.

(21) Appl. No.: 14/849,929

(22) Filed: Sep. 10, 2015

(65) Prior Publication Data

US 2017/0048185 A1    Feb. 16, 2017

(30) Foreign Application Priority Data

Aug. 14, 2015  (EP) .................................... 15181102

(51) Int. Cl.
  *G06F 15/16*  (2006.01)
  *H04L 12/58*  (2006.01)
  *G06Q 50/00*  (2012.01)

(52) U.S. Cl.
  CPC ............. *H04L 51/32* (2013.01); *G06Q 50/01* (2013.01)

(58) Field of Classification Search
  USPC ........................................................ 709/218
  See application file for complete search history.

(56) References Cited

U.S. PATENT DOCUMENTS

| | | | | |
|---|---|---|---|---|
| 7,152,056 B2* | 12/2006 | Snyder | ................. | G06F 17/277 |
| 8,095,432 B1* | 1/2012 | Berman | ............. | G06Q 30/0631 |
| | | | | 705/26.7 |
| 8,645,064 B2* | 2/2014 | Bednar | ................. | H04W 4/206 |
| | | | | 340/309.16 |
| 8,832,195 B2* | 9/2014 | Rama Rao | ............. | H04L 51/32 |
| | | | | 709/204 |
| 9,092,485 B2* | 7/2015 | Rubinstein | ........ | G06F 17/30528 |
| 9,143,468 B1* | 9/2015 | Cohen | .................... | H04L 51/32 |
| 9,223,838 B2* | 12/2015 | Rubinstein | ........ | G06F 17/30554 |

(Continued)

FOREIGN PATENT DOCUMENTS

EP        15181102        8/2015

*Primary Examiner* — Alicia Baturay
(74) *Attorney, Agent, or Firm* — Slayden Grubert Beard PLLC

(57) ABSTRACT

A method poses requests in a social networking site by a submitting user by a terminal connected to a communication network to a previously unknown group of receiving users is disclosed. A relationship data model is provided which comprises objects linked to each other by semantic and/or a social relations. The question, i.e. content of the request, generally includes a question text in a text format, preferably in a natural language such as English. The question text includes one or more request meta data terms, whereby each request meta data term includes an identifier symbol, a connector symbol and a connector. The at least one request meta data term is then mapped to objects of the relationship data model. This mapping results in generating at least one group of receiving users. The submitted message is finally distributed via the communication network to the group of receiving users.

17 Claims, 1 Drawing Sheet

```
@?lithograpy$200000 Looking for
suggestions on beam-shaping aperture
for a high-resolution electron-beam
    lithograpy @?aperture$50000
```

(56) References Cited

U.S. PATENT DOCUMENTS

| | | | | |
|---|---|---|---|---|
| 9,275,101 B2* | 3/2016 | Rubinstein | ........ | G06F 17/30528 |
| 9,275,119 B2* | 3/2016 | Rubinstein | ........ | G06F 17/30554 |
| 9,424,354 B2* | 8/2016 | Teevan | .............. | G06F 17/30864 |
| 9,582,552 B2* | 2/2017 | Rubinstein | ........ | G06F 17/30554 |
| 9,589,011 B2* | 3/2017 | Rubinstein | ........ | G06F 17/30528 |
| 2010/0268661 A1* | 10/2010 | Levy | ...................... | G06Q 30/02 |
| | | | | 705/347 |
| 2013/0024391 A1* | 1/2013 | Vakil | ................. | G06Q 30/0282 |
| | | | | 705/319 |
| 2013/0232200 A1* | 9/2013 | Knapp | ................... | H04L 67/306 |
| | | | | 709/204 |
| 2013/0268377 A1* | 10/2013 | Jessup | ................. | G06Q 30/0605 |
| | | | | 705/14.73 |
| 2013/0311283 A1* | 11/2013 | Liu | .................... | G06F 17/30539 |
| | | | | 705/14.53 |
| 2014/0025670 A1* | 1/2014 | Daran | ................. | G06F 17/3053 |
| | | | | 707/724 |
| 2014/0129505 A1* | 5/2014 | Lin | ......................... | G06Q 50/01 |
| | | | | 706/50 |
| 2016/0042429 A1* | 2/2016 | Bank | ................. | G06Q 30/0631 |
| | | | | 705/26.7 |
| 2016/0042433 A1* | 2/2016 | Bank | ................. | G06Q 30/0631 |
| | | | | 705/26.7 |
| 2016/0226984 A1* | 8/2016 | Kelly | ...................... | H04L 67/22 |
| 2016/0227283 A1* | 8/2016 | Kelly | ................. | H04N 21/4667 |
| 2016/0284005 A1* | 9/2016 | Daniel | ............... | G06Q 30/0631 |
| 2016/0284011 A1* | 9/2016 | Dong | ................. | G06Q 30/0631 |
| 2016/0285790 A1* | 9/2016 | Szeto | ................. | G06Q 30/0631 |
| 2016/0285816 A1* | 9/2016 | Schmid | ............. | G06Q 30/0631 |

\* cited by examiner

@?questiontag$value

@?lithograpy$200000 Looking for suggestions on beam-shaping aperture for a high-resolution electron-beam lithograpy @?aperture$50000

METHOD FOR POSING REQUESTS IN A SOCIAL NETWORKING SITE

CROSS REFERENCE TO RELATED APPLICATIONS

This application is based on and hereby claims priority to European Application No. 15181102 filed on Aug. 14, 2015, the contents of which are hereby incorporated by reference.

BACKGROUND

The disclosed embodiments generally relate to methods for posing requests. Specifically, the disclosed embodiments relate to methods for posing requests in social or enterprise networks using a relationship data model comprising semantic and/or a social relations.

Currently known digital interactions provide various opportunities for individuals to discuss subjects that interest them. For example, users may participate in message boards, maintain a blog, comment on various webpages, or participate in a real-time messaging service such as TWITTER™. A user who is interested in comments made by others on a particular topic can use these technologies to stay up to date on the latest discussions.

In some cases, users will include information such as hashtags in their comments to help other users identify the topic or topics that are being discussed. Thus, other users who are interested in a particular topic can search for comments that include the hashtag to find out more about the topic. Likewise, users can include web links that are associated with a particular topic in their comments.

However, often the number of comments that reference a particular hashtag or web link can grow quite large. Due to the large number of comments, it may be relatively burdensome for the user to understand the major points of discussion associated with a particular hashtag or web link. This holds especially for a user wishing to find an appropriate answer for a request posed in a discussion board.

SUMMARY

The present disclosure relates to a technique for directing a request to a previously unknown group of receiving users. In one embodiment a method for posing requests to a previously unknown group of receiving users is disclosed.

The question, i.e. content of the request, generally includes a question text in a text format, preferably in a natural language such as English. The question text includes one or more request meta data terms, whereby each request meta data term includes:

an identifier symbol, preferably an at-sign or >>@<<-symbol, which is usually used for identifying a particular user or group of users, e.g. >>@usergroup<< or>>@Bob<<. However, in the context of the embodiments, the group of users is not determined yet. The portion of the request meta data term following the identifier symbol will therefore, according to the embodiments, be used for characterizing the previously unknown group of receiving users. Later, the portion of the request meta data term following the identifier symbol of the initial request may be treated or replaced by an identifier of user group answering the request, e.g. >>@requestgroup<<. The previously unknown group of receiving users is semantically defined by portions of the request meta data term following the identifier symbol.

a connector symbol, preferably a question mark or >>?<<-symbol, in order to differentiate a request from general discussion topics which generally comprise a >>hashtag<< prefixed by a number sign or >>#<<-symbol. The specific notation by a connector symbol according to the embodiments allows users identifying their request and to differentiate such requests from hashtags indicating other topics or topics that are being discussed. According to the embodiments, the connector symbol prefixes a connector.

A connector: According to the embodiments, users can submit requests to a social networking site. The request meta data term of the request includes a connector, such as a web link or a hashtag, the connector identifying a characteristic of a plurality of communications having a common connector, wherein the plurality of communications are related with the request, e.g. answering the request or re-answering an answer to the request.

The at least one request meta data term is then mapped to objects of the relationship data model. The relationship data model comprises objects linked to each other by semantic and/or a social relations. The mapping of the meta data term to objects of the relationship data model generates at least one group of receiving users. The submitted message is finally distributed via the communication network to the group of receiving users. The receiving users may optionally comprise a subset of a group of potential receiving users, i.e. filtered from at least one group of potential receiving users.

A group of receiving users may change dynamically depending on semantic content of the request, depending on social relationships between the users and depending on the request meta data term itself.

In a possible embodiment the mapping to objects of the relationship data model does not consider the complete request meta data term, but only the connector. This allows for an instant mapping based on a short term as a hashtag.

In a possible embodiment a portion of the request meta data term following the identifier symbol is preliminary characterizing the previously unknown group of receiving users. Unlike known message distribution systems which are identifying a particular user or a group of users, the portion of the request meta data term following the identifier symbol is an operational term which is used to characterize the previously unknown group of receiving users by a later part of the proposed method, rendering the previously unknown group to a determined group of users based on the semantic definition by portions of the request meta data term following the identifier symbol.

In a possible embodiment the connector—which is a portion of the request meta data term following the connector symbol—is identifying a characteristic of a plurality of communications having a common connector, the plurality of communications related with the request. The connector may comprise a hashtag or a web link included in each of the plurality of communications having a common connector.

In a possible embodiment the request meta data term additionally comprises, or: is concatenated by, a currency symbol—e.g. a dollar sign—and a numeric value. The numeric value may relate to a business value or an incentive offered for an appropriate answer to the request.

In a possible embodiment the request meta data term or the connector within is derived automatically from the question text of the request and subject to be altered or weighted by a numeric value described below.

In a possible embodiment, the relationship data model provides a semantic network data model comprising terms linked to each other by semantic relations and/or a social network data model comprising users linked to each other by social relations.

In a possible embodiment a mapping engine is adapted to expand the at least one request meta data term to related associated terms on the basis of semantic relation links of said semantic network data model weighted by the numeric value.

In a possible embodiment the relationship data model includes at least one of a semantic data model, social network data model, and/or a multi-layered relationship model.

According to a possible embodiment a computer program product is disclosed, which contains a program code stored on a computer-readable medium and which, when executed on a server of a communication network, carries out a method according to one of the embodiments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figures 1, 2, 3:
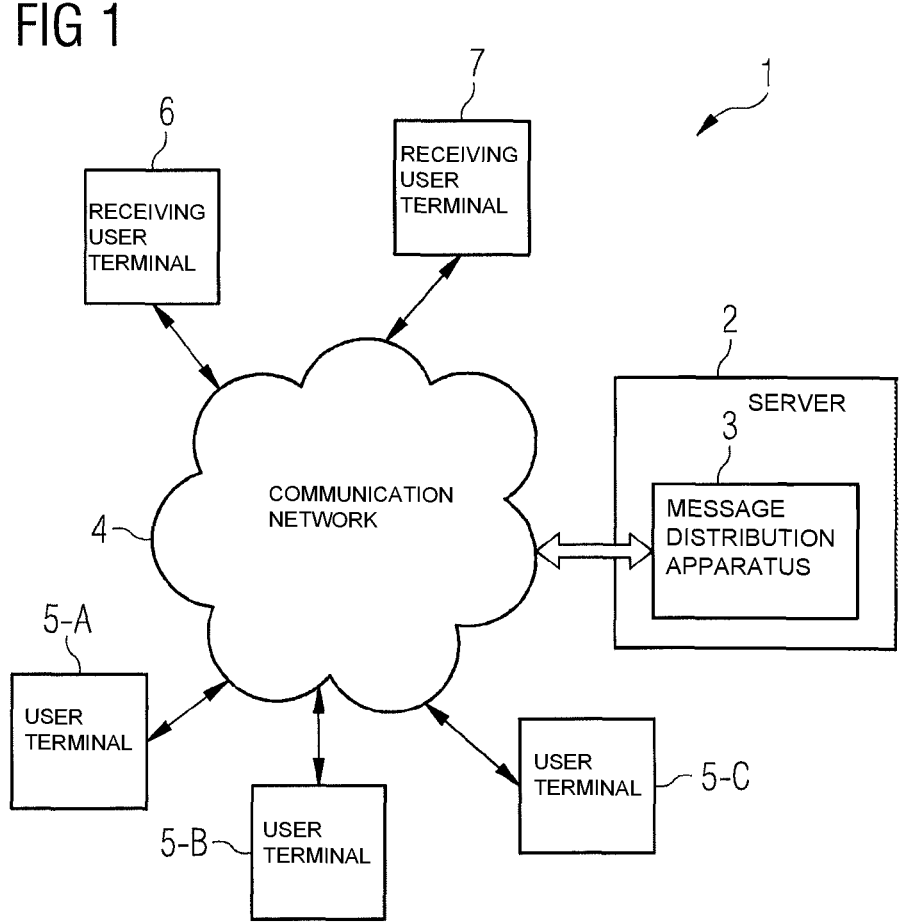
FIG. 1 shows a block diagram of a communication network according to an embodiment.
FIG. 2 shows a request meta data term according to an embodiment.
FIG. 3 shows an exemplary request according to an embodiment.

Reference will now be made in detail to the preferred embodiments of the present invention, examples of which are illustrated in the accompanying drawings, wherein like reference numerals refer to like elements throughout.

FIG. 1 shows a communication system 1 comprising at least one message distribution apparatus 3 assigned to a server 2 of the communication system 1. A—not shown—request which is submitted by a user of a terminal 5-A in the form of an electronic message is distributed by the message distribution apparatus 3.

The message distribution apparatus 3 is provided for distributing the request as an electronic message which is submitted or posed by the user of the terminal 5-A. Each terminal 5-A, 5-B, 5-C comprises a user interface for a corresponding user.

Users may include natural persons exchanging messages via the communication network 4 or higher layer applications using the message distribution apparatus 3 for exchanging information.

The communication network 4 as shown in FIG. 1 can be any kind of network, in particular a wired or wireless network. The communication network 4 can comprise a data network including a local area network LAN, a wide area network WAN, the internet. The communication network 4 is adapted to transport electronic messages including e-mails, SMS messages, RSS-feeds, voice messages or any kind of data packet streams. The message distribution apparatus 3 comprises a—not shown—mapping engine and a—not shown—distribution engine.

The message distribution apparatus 3 is provided for distributing the request submitted by the user of terminal 5-A connected to the communication network 4 to a previously unknown group of receiving user terminals 6,7.

When distributing the request submitted by the user by terminal 5-A connected to the communication network 4 to a previously unknown group of receiving users, a—not shown—relationship data model comprising is used. This data model includes objects linked to each other by semantic and/or a social relations.

FIG. 2 shows a request meta data term according to an embodiment. A—not shown—request submitted by the submitting user compromises a—not shown—question text in a text format, preferably in a natural language such as English. The question text includes one or more request meta data terms whose general structure shown in FIG. 2.

An identifier symbol @ is prefixing a particular user or group of users, e.g. >>@usergroup<< or >>@Bob<<. However, in the context of the embodiments, the group of users is not determined yet. The portion of the request meta data term following the identifier symbol @ will therefore, according to the embodiments, be used for characterizing the previously unknown group of receiving users. The identifier symbol @ is concatenated by a connector symbol, here a question mark >>?<<

In order to differentiate a request from social discussion topics which generally comprise a >>hashtag<< prefixed by a number sign or >>#<<-symbol, this specific notation of the connector symbol allows for a user to uniquely identify a request and to differentiate such requests from general social discussions using a >>#<<-symbol. The connector symbol >>?<< prefixes a connector >>questiontag<<.

The connector >>questiontag<< is provisioned by a questiontag, i.e. a hashtag dedicated to a request, identifying a plurality of communications having a common connector. A plurality of communications related with the request, e.g. answering the request or re-answering an answer to the request, is likewise using this connector. Alternatively, the connector may include a web link such as a URI (Uniform Resource Identifier).

The request meta data term according to FIG. 2 further comprises a currency symbol >>$<< concatenated to the questiontag and a numeric value >>value<< concatenated to the currency symbol >>$<<. The numeric value relates to a business value or an incentive offered for an appropriate answer to the request.

FIG. 3 shows an exemplary request according to an embodiment. The request is directed to a technical solution on beam-shaping aperture for high-resolution electron-beam lithography and comprising two request meta data terms, namely >>@?lithography$200000<< and >>@?aperture$50000<<. By posing the request, the user submits a numeric value, estimating a business value for improvements in the field of lithography by a value of $ 200,000, while a particular improvement in an aperture is estimated by $ 50,000.

According to an embodiment, this numeric value influences the range of recipients in that each request meta data term is expanded to related associated terms on the basis of semantic relation links of the semantic network data model weighted by the numeric value. Accordingly, the group of recipients having an expertise related to lithography may be higher than recipients having a special knowledge in aperture devices.

The numeric value is preferably considered by two possible embodiments: According to a first embodiment, a higher numeric value is considered by semantically expanding the connector, i.e. by increasing synonyms and semantic terms related to the connector to which the numeric value is assigned to. Expanding the connector may further include terms having a semantic distance specified by the weight. This will increase the importance of the higher weighted connector in relation to other connectors. Expanding the connector will further increase the number of recipients, since additional terms will naturally increase persons which are possibly interested in topics of expanded tags. Further on, a higher weight may include terms which have a co-occurrence or co-tagging relation with the meta data to which the numerical value reflecting the weight is assigned to.

According to a second embodiment, a higher weight of the connector is considered by directly influencing a ranking of search terms. By this variant, no further semantic resources are expanded, only the ranking of a group of potential receiving users is reorganized. Both embodiments are certainly combinable.

Subsequent to the determination of one or more user groups of recipients by mapping the request meta data term to objects of the relationship data model, the one or more groups of receiving users are generated as a result of said mapping.

The receiving users may be the result of users, which have used the questiontag as hashtag or which have forwarded or >>re-tweeted<< postings with such a hashtag or which have replied to a message with such a hashtag. The act of mapping conflates such occurrences in a common measure by a ranking of users which have been influenced by this hashtag in any way.

The receiving users may optionally comprise a subset of a group of potential receiving users, i.e. filtered from at least one group of potential receiving users. Additional conditions may modify the user count of the group, e.g. a size of the group of receiving users and/or an expected number of submitted messages, which may both limited.

The request is, then, distributed via the communication network to the respective group of receiving users. This distribution may include a further amendment of the request in that the the recipients may then addressed by >>@username<< or >>@usergroup<< instead of the >>@?questiontag$value<< notation assigned to the previously unknown group of recipients. In other words, the portion of the request meta data term following the identifier symbol @ of the initial request may be treated or replaced by an identifier of user group answering the request.

A recipient which is able to appropriately reply the request may do so by simply answering the request. The requesting user may then decide if the reply is relevant. For the case that the numeric value associated with the request was offered as an incentive for an appropriate answer, a money transfer may be electronically effected.

It is to be understood that the elements and features may be combined in different ways that likewise fall within the scope of the proposals. Thus, each dependent feature can modify any other dependent feature regardless of whether described preceding or following the feature.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004). It is therefore intended that the foregoing description be regarded as illustrative rather than limiting, and that it be understood that all equivalents and/or combinations of embodiments are intended to be included in this description.

The invention claimed is:

1. A method for posing a request, comprising:
   providing a relationship data model comprising objects linked to each other by semantic and/or a social relations;
   submitting the request in a social networking site, the request being submitted by a submitting user via a terminal connected to a communication network, the request being posed to a previously unknown group of receiving users, the request comprising a request text, the request text including a request content portion and a request meta data term,
   wherein the request meta data term for each respective request comprises:
      a prefix identifier symbol,
      a connector symbol classifying the respective request as a request type of communication, thereby distinguishing the respective request from other types of communications communicated via the social network site, and
      a connector configured to identify the respective request and subsequent communications responding to the respective request;
   mapping the connector of the request meta data term to objects of the relationship data model;
   using the mapping to generate the group of receiving users;
   distributing the request via the communication network to the group of receiving users; and
   receiving, from at least one user in the group of receiving users, at least one communication responding to the respective request, wherein each communication responding to the respective request includes meta data including the connector included in the request meta data term of the respective request,
   such that the connector is used both for generating the group of receiving users for each respective request and for collectively identifying the respective request and communications responding to the respective request.

2. The method according to claim 1, wherein mapping the request meta data term to objects of the relationship data model comprises mapping the connector of the request meta data term to objects of the relationship data model.

3. The method according to claim 1, wherein a portion of the request meta data term following the prefix identifier symbol is preliminary characterizing the group of receiving users.

4. The method according to claim 1, wherein the prefix identifier symbol is an at-sign.

5. The method according to claim 1, wherein the connector follows the connector symbol, and the connector identifies a characteristic of a plurality of communications, such that the connector is a common connector included in each of the plurality of communications, the plurality of communications being related with the request.

6. The method according to claim 5, wherein the connector comprises a hashtag or a web link included in each of the plurality of communications.

7. The method according to claim 1, wherein the connector symbol is a question mark.

8. The method according to claim 1, wherein the request meta data term additionally comprises:
   a currency symbol; and
   a numeric value.

9. The method according to claim 8, wherein the numeric value relates to a business value or an incentive offered for an appropriate answer to the request.

10. The method according to claim 8, wherein the relationship data model comprises a semantic network data model, and mapping the request meta data term to objects of the relationship data model includes expanding the request meta data term to related associated terms based on semantic relation links of the semantic network data model, the semantic relation links being weighted by the numeric value.

11. The method according to claim 10, the mapping of the request meta data term to objects of the relationship data model includes calculating a sorted list of associated related terms that are associated with the request meta data term, the sorted list being calculated based on weighted semantic relations of the relationship data model in order to identify users having a relation to the associated related terms.

12. The method according to claim 11, wherein the relationship data model also has objects linked to each other by social relations, and mapping the request meta data term to objects of the relationship data model includes expanding the users identified to have a relation to the associated related terms, to users having a close social relationship with the users identified to have a relation to the associated related terms, the expanding being performed based on the social relations of the relationship data model.

13. The method according to claim 1, the relationship data model provides a semantic network data model comprising terms linked to each other by semantic relations.

14. The method according to claim 1, the relationship data model provides a social network data model comprising users linked to each other by social relations.

15. The method according to claim 1, wherein the relationship data model includes at least one of a semantic data model, a social network data model, and a multi-layered relationship model.

16. The method according to claim 1, wherein the request text includes a plurality of request meta data terms, and each meta data term is mapped to objects of the relationship data model.

17. A non-transitory computer readable storage device containing a computer program, which when executed on a server of a communication network, causes the server to carry out a method for posing a request, the method comprising:

providing a relationship data model comprising objects linked to each other by semantic and/or a social relations;

submitting the request in a social networking site, the request being submitted by a submitting user via a terminal connected to a communication network, the request being posed to a previously unknown group of receiving users, the request comprising a request text, the request text including a request content portion and a request meta data term, wherein the request meta data term for each respective request comprises:
  a prefix identifier symbol,
  a connector symbol classifying the respective request as a request type of communication, thereby distinguishing the respective request from other types of communications communicated via the social network site, and
  a connector configured to identify the respective request and subsequent communications responding to the respective request;

mapping the connector of the request meta data term to objects of the relationship data model;

using the mapping to generating the group of receiving users;

distributing the request via the communication network to the group of receiving users; and receiving, from at least one user in the group of receiving users, at least one communication responding to the respective request, wherein each communication responding to the respective request includes meta data including the connector included in the request meta data term of the respective request, such that the connector is used both for generating the group of receiving users for each respective request and for collectively identifying the respective request and communications responding to the respective request.

* * * * *